(12) United States Patent
Zeng et al.

(10) Patent No.: US 10,565,742 B1
(45) Date of Patent: Feb. 18, 2020

(54) IMAGE PROCESSING METHOD AND APPARATUS

(71) Applicant: SHENZHEN CHINA STAR OPTOELECTRONICS SEMICONDUCTOR DISPLAY TECHNOLOGY CO., LTD., Guangdong (CN)

(72) Inventors: Yuchao Zeng, Guangdong (CN); Tai-jiun Hwang, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 287 days.

(21) Appl. No.: 15/735,537

(22) PCT Filed: Nov. 23, 2017

(86) PCT No.: PCT/CN2017/112480
§ 371 (c)(1),
(2) Date: Dec. 11, 2017

(87) PCT Pub. No.: WO2019/061766
PCT Pub. Date: Apr. 4, 2019

(30) Foreign Application Priority Data

Sep. 27, 2017 (CN) .......................... 2017 1 0893737

(51) Int. Cl.
*G06K 9/00* (2006.01)
*G06T 11/00* (2006.01)
(Continued)

(52) U.S. Cl.
CPC .............. *G06T 11/001* (2013.01); *G06T 5/40* (2013.01); *G06T 7/90* (2017.01); *G06T 2207/10024* (2013.01)

(58) Field of Classification Search
CPC . G06T 11/001; G06T 5/40; G06T 7/90; G06T 2207/10024
See application file for complete search history.

(56) References Cited

U.S. PATENT DOCUMENTS

| 4,868,651 | A | 9/1989 | Chou et al. |
| 10,383,515 | B2 * | 8/2019 | Kim .................. G06K 9/00597 |

(Continued)

FOREIGN PATENT DOCUMENTS

| CN | 1750043 A | 3/2006 |
| CN | 101437114 A | 5/2009 |

(Continued)

*Primary Examiner* — Aaron W Carter
(74) *Attorney, Agent, or Firm* — Hemisphere Law, PLLC; Zhigang Ma

(57) ABSTRACT

The present invention discloses an image processing method and apparatus. The method comprises the steps of: counting the number of pixels distributing in different brightness values in the target image; determining an initial central brightness value that maximum numbers of pixels have and determining an average brightness value of the target image; and adjusting a quantity distribution of the pixels in the target image at different brightness values, so as to make a new central brightness values that maximum number of pixels have closer to the average brightness value than the initial central brightness value, and to expand a range of pixel brightness values having preset brightness thresholds in which the new central brightness value is included. The present invention discloses an image processing method and apparatus, which enlarges the range around the central brightness value and adjusts the brightness distribution of the image to enhance the details of the image.

20 Claims, 6 Drawing Sheets

(51) Int. Cl.
 *G06T 5/40* (2006.01)
 *G06T 7/90* (2017.01)

(56) References Cited

U.S. PATENT DOCUMENTS

| | | | | |
|---|---|---|---|---|
| 2007/0025683 A1* | 2/2007 | Nobori | ............... | G09G 3/3611 |
| | | | | 385/147 |
| 2007/0047808 A1* | 3/2007 | Choe | ............... | G06T 5/009 |
| | | | | 382/169 |
| 2008/0101697 A1* | 5/2008 | Cho | ............... | G06T 5/009 |
| | | | | 382/169 |
| 2010/0283847 A1* | 11/2010 | Aikawa | ............... | G01N 21/8803 |
| | | | | 348/142 |
| 2011/0206280 A1* | 8/2011 | Lee | ............... | G06T 5/009 |
| | | | | 382/167 |
| 2013/0332866 A1* | 12/2013 | Johnson | ............... | H04N 5/232 |
| | | | | 715/764 |
| 2015/0356904 A1* | 12/2015 | Nakatani | ............... | G09G 5/377 |
| | | | | 345/690 |
| 2016/0088712 A1* | 3/2016 | Kim | ............... | H05B 37/0218 |
| | | | | 315/149 |
| 2016/0277657 A1* | 9/2016 | Zeng | ............... | G06T 5/00 |
| 2018/0082660 A1* | 3/2018 | Xu | ............... | G09G 3/3208 |
| 2018/0090100 A1* | 3/2018 | Xu | ............... | G09G 3/3208 |
| 2018/0205867 A1* | 7/2018 | Agata | ............... | H04N 5/23229 |
| 2019/0035357 A1* | 1/2019 | Lim | ............... | G09G 5/02 |

FOREIGN PATENT DOCUMENTS

| | | |
|---|---|---|
| CN | 101510302 A | 8/2009 |
| CN | 102750672 A | 10/2012 |
| CN | 103702034 A | 4/2014 |
| CN | 104637030 B | 8/2017 |

\* cited by examiner

IMAGE PROCESSING METHOD AND APPARATUS

RELATED APPLICATIONS

The present application is a National Phase of International Application Number PCT/CN2017/112480, filed Nov. 23, 2017, and claims the priority of China Application No. 201710893737.4, filed Sep. 27, 2017.

FIELD OF THE DISCLOSURE

The present invention is related to a field of image processing, and particularly to a method and apparatus of processing an image.

BACKGROUND

Image processing includes emphasizing the overall or local characteristics of an image, making an originally unclear image become clear or emphasizing certain features of interest, widening the difference between the features of different objects in the image, and suppressing uninteresting features, so as to improve the image quality, to rich information, to strengthen image interpretation and recognition effects, and to meet the needs of some special analysis.

Due to the affection from many of the scene conditions, visual effect of a captured image is poor. An image processing technology to improve visual effects to human is thus required, such as highlighting some of the characteristics of the target object in the image and extracting characteristic parameters of the target object from the digital image. These are good for recognizing, tracking and understanding the target in the image.

Because the grayscale produced by a camera is constrained, some detail may be lost in taking pictures with the camera. When the picture is taken, high brightness pixels will get together and become bigger if the area to be focused is a dark area in brightness, and thus the detail in higher brightness will be lost. However, low brightness pixels will get together and become bigger if the area to be focused is a bright area in brightness, and thus the detail in darker brightness will be lost.

SUMMARY

A main problem to be solved by the present invention is to provide an image processing method and apparatus which can enhance the details of an image by enlarging a display range around a central brightness region and adjusting the brightness distribution of the image.

In order to solve the above technical problem, a technical solution adopted by the present invention is to provide an image processing method, which includes: acquiring a target image; obtaining a gray value of each pixel in the target image as a brightness value when the target image is a grayscale image; obtaining a brightness value of one color component of each pixel in the target image when the target image is a color image; establishing a brightness value-pixel quantity histogram with the brightness value as an abscissa and the number of pixels as a vertical coordinate; determining an initial central brightness value that maximum numbers of pixels have and determining an average brightness value of the target image; and adjusting a quantity distribution of the pixels in the target image at different brightness values, so as to make a new central brightness values that maximum number of pixels have closer to the average brightness value than the initial central brightness value, and to expand a range of pixel brightness values having preset brightness thresholds in which the new central brightness value is included.

In order to solve the above technical problem, one technical solution adopted by the present invention is to provide an image processing method, which comprises: counting the number of pixels distributing in different brightness values in the target image; determining an initial central brightness value that maximum numbers of pixels have and determining an average brightness value of the target image; and adjusting a quantity distribution of the pixels in the target image at different brightness values, so as to make a new central brightness values that maximum number of pixels have closer to the average brightness value than the initial central brightness value, and to expand a range of pixel brightness values having preset brightness thresholds in which the new central brightness value is included.

In order to solve the above technical problem, one technical solution adopted by the present invention is to provide an image processing apparatus comprising a memory, a processor, and an input/output device, connected to each other, the memory being configured to store a computer program and the computer program being implementing the above method when it is executed by the processor.

By means of the above solution, the beneficial effects of the present invention are as follows. The present invention discloses an image processing method and apparatus, wherein the method comprises the steps of: counting the number of pixels distributing in different brightness values in the target image; determining an initial central brightness value that maximum numbers of pixels have and determining an average brightness value of the target image; and adjusting a quantity distribution of the pixels in the target image at different brightness values, so as to make a new central brightness values that maximum number of pixels have closer to the average brightness value than the initial central brightness value, and to expand a range of pixel brightness values having preset brightness thresholds in which the new central brightness value is included; and transferring the brightness values into image pixel values to get an adjusted image. The present invention discloses an image processing method and apparatus, which enlarges the range around the central brightness value for display and adjusts the brightness distribution of the image to enhance the details of the image.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

Figure 1:
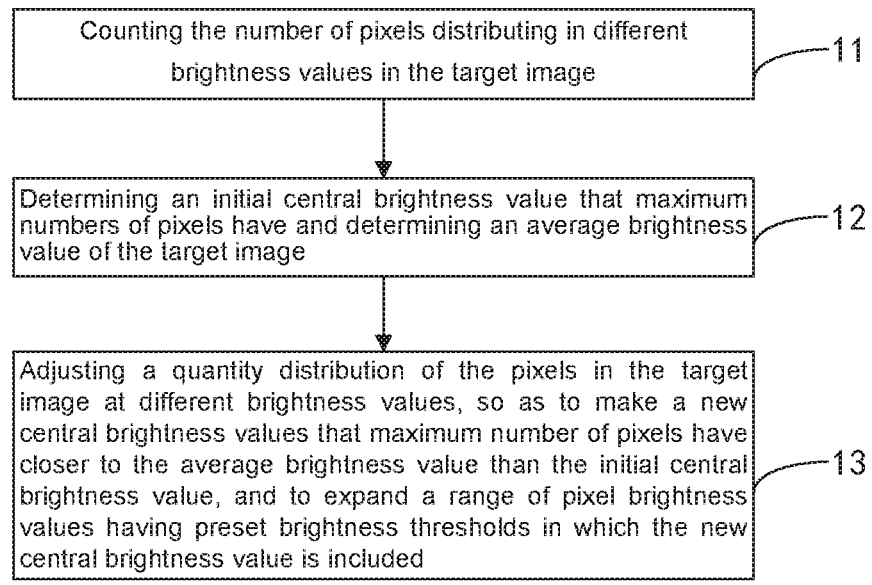
FIG. 1 is a schematic flow chart of an embodiment of an image processing method provided by the present invention.

Referring to FIG. 1, FIG. 1 is a schematic flow chart of an embodiment of an image processing method according to the present invention. The image processing method includes the following steps.

In step 11, a step of counting the number of pixels distributing in different brightness values in the target image is performed.

It can be understood that the so-called brightness value is generally for a grayscale image (black-and-white images) for expressing the brightness of the grayscale image. For a color image, however, the brightness value may be the brightness of a certain color component in the color image. Taking an RGB image as an example, a brightness value of a pixel in an RGB image may be a brightness value of a R, G, or B color components therein.

In one embodiment, $2^8=256$ brightness values can be used, that is, 0-255. Gray scale of 0 represents black, and gray scale of 255 represents white.

Optionally, before this step, it may further include a step of acquiring a target image. When the target image is a grayscale image, since a brightness value is equal to a grayscale value, a grayscale of each pixel in the target image can be acquired as a brightness value. When the target image is a color image, a brightness value of one color component of each pixel in the target image is acquired.

Optionally, a method of calculating the brightness value of one pixel in the color image comprises using a Y value in a (Y, Cr, Cb) color space to represent the brightness value L, and using Cr and Cb to denote the chromas of red and blue colors respectively. Alternatively, RGB components in a (R, G, B) color space can be used for brightness values. For example, a brightness value can be equal to 0.299R+0.587G+0.114B or Max (R, G, B). Alternatively, a (L, a, b) color space can be used to represent the brightness value, wherein L, a, and b are the chroma coordinates and the like.

In a specific embodiment, the step 11 can be consolidated as obtaining a brightness value of the target image, establishing a brightness value-pixel quantity histogram with the brightness value as an abscissa and the number of pixels as a vertical coordinate.

Figure 2:
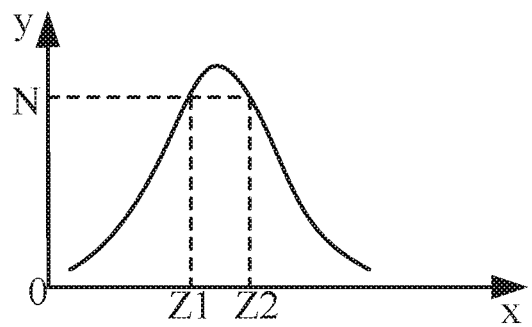
FIG. 2 is a brightness value-pixel quantity schematic diagram of the target image according to an embodiment of the image processing method provided by the present invention.

Referring to FIG. 2, FIG. 2 is a brightness value-pixel quantity schematic diagram of the target image according to an embodiment of the image processing method provided by the present invention, wherein the x-axis represents the brightness value, the y-axis represents the number of pixels, N is the number of pixels, Z1 and Z2 are the brightness values corresponding to N pixels.

In Step 12, a step of determining an initial central brightness value that maximum numbers of pixels have and determining an average brightness value of the target image is performed.

According to the brightness value-pixel quantity histogram, a brightness value corresponding to the number of pixels having a maximum number is obtained as the initial central brightness value, and the brightness values of the target image is averaged to obtain the average brightness value.

In Step 13, a step of adjusting a quantity distribution of the pixels in the target image at different brightness values, so as to make a new central brightness values that maximum number of pixels have closer to the average brightness value than the initial central brightness value, and to expand a range of pixel brightness values having preset brightness thresholds in which the new central brightness value is included is performed.

Figure 3:
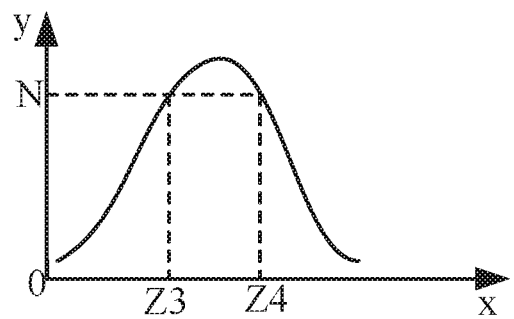
FIG. 3 is a brightness value-pixel quantity schematic diagram of the target image after an adjustment according to an embodiment of the image processing method provided by the present invention.

Referring to FIG. 3, FIG. 3 is a brightness value-pixel quantity schematic diagram of the target image after an adjustment according to an embodiment of the image processing method provided by the present invention, wherein the x axis represents the brightness value, the y axis represents the pixel number, Z3 and Z4 are the brightness values corresponding to N pixels. It can be seen that, compared with FIG. 2, the brightness range in the vicinity of the central pixel of the processed target image becomes wider.

Optionally, after the brightness value of the target image is adjusted, the brightness value of each pixel is converted into a corresponding pixel value. For a grayscale image, the brightness value is a grayscale value, and thus the image pixel value is the adjusted brightness value. According to the adjusted brightness value, the pixel value of an image is obtained. For a color image, a color space is required to convert the brightness value into an image pixel value to obtain an adjusted image.

Being different from the prior art, the image processing method disclosed in the present embodiment first counts the number of pixels in different target distributing in different brightness values, determines the initial central brightness value with the largest number of pixels, determines an average brightness value of the target images; and adjust a quantity distribution of the pixels in the target image at different brightness values, so as to make a new central brightness values that maximum number of pixels have closer to the average brightness value than the initial central brightness value, and to expand a range of pixel brightness values having preset brightness thresholds in which the new central brightness value is included.

By means of expanding the range around the central brightness value and adjusting the image brightness distribution, an enhancement to the image detail is achieved. For example, where the number of pixels N is 100, its brightness value of Z1 is 100 and its brightness value of Z2 is 150, its central brightness value 130. After adjustment, its brightness value of Z3 is 90 and its brightness value of Z4 is 165, the new central brightness value is 128. Thus, in terms of the 100 pixels, its original range of corresponding brightness values is 50, but its adjusted range of brightness values becomes 75.

Figure 4:
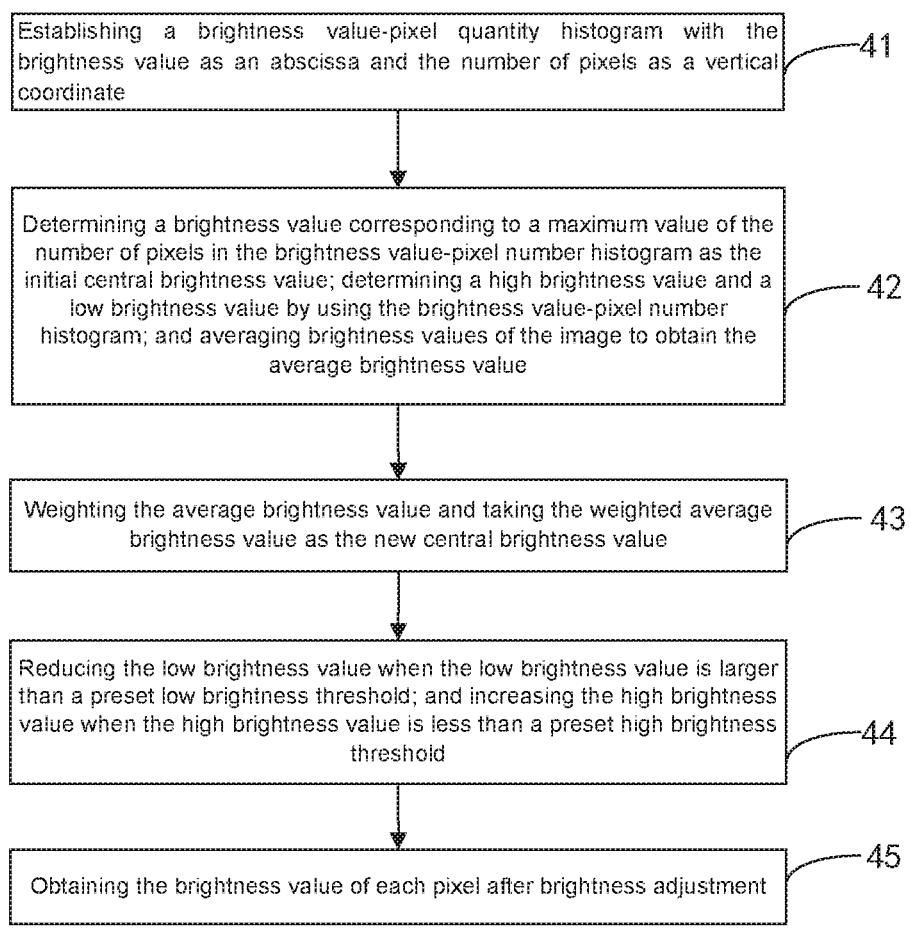
FIG. 4 is a schematic flow chart of another embodiment of the image processing method provided by the present invention.

Referring to FIG. 4, FIG. 4 is a schematic flow chart of another embodiment of an image processing method according to the present invention. The method includes the following steps.

In Step 41, a step of establishing a brightness value-pixel quantity histogram with the brightness value as the abscissa and the number of pixels as the ordinate is performed.

In Step 42, a step of determining a brightness value corresponding to a maximum value of the number of pixels in the brightness value-pixel number histogram as an initial central brightness value; determining a high brightness value and a low brightness value by using the brightness value-pixel number histogram; and averaging brightness values of the image to obtain the average brightness value is performed.

Optionally, the details in Step 42 of using the brightness value-pixel quantity histogram to determine the high brightness value and the low brightness value, and averaging the brightness values of the target image to obtain an average brightness value, can be implemented by the following method.

That is, the method comprises the steps of starting from the number of pixel having the lowest brightness value, accumulating it by adding a preset number of pixels, setting the brightness value of the last accumulated number of pixels as the low brightness value. Similarly, the method further comprises the steps of accumulating the number of pixels having the highest brightness value by adding the present number of pixels, and setting the brightness value of the last accumulated number of pixels as the high brightness value.

For example, if the target image is a grayscale image and 40 is the preset number of pixels, the brightness values corresponding to the number of 40 pixels in the brightness value-pixel quantity histogram are 50 and 200, respectively, then the low brightness value is 50 and the high brightness value is 200. If the number of 40 pixels does not have a corresponding brightness value, then the brightness value corresponding to the smallest number is selected, for example, the brightness value corresponding to the number of 39 or 41 pixels.

In Step 43, a step of weighting the average brightness value and taking the weighted average brightness value as the new central brightness value is performed.

In this step, when the initial central brightness value is larger than the average brightness value, the weighting coefficient of the weighting process is larger than 1, and when the initial central brightness value is less than the average brightness value, the weighting coefficient of the weighting process is less than 1.

In Step 44, a step of reducing the low brightness value when the low brightness value is larger than a preset low brightness threshold; and increasing the high brightness value when the high brightness value is less than a preset high brightness threshold is performed.

Optionally, the step 44 may specifically include the details below.

When the low brightness value is greater than the preset low brightness threshold, the low brightness value is weighted, and the low brightness value $L_1$ is multiplied by a low brightness adjustment coefficient $R_1$. When the low brightness value after the weighting process is less than the preset low brightness threshold, the weighted low brightness value is taken as a new low brightness value. When the weighted low brightness value is greater than the preset low brightness threshold, the low brightness threshold is taken as the new low brightness value.

Moreover, when the high brightness value is less than the preset high brightness threshold, the high brightness value is weighted. When the high brightness value after the weighting process is greater than the preset high brightness threshold, the weighted high brightness value is taken as a new high brightness value. When the weighted high brightness value is less than the preset high brightness threshold, the high brightness threshold is used as the new high brightness value.

Optionally, the step 44 is described in detail by using two schematic diagrams below.

Figure 5:
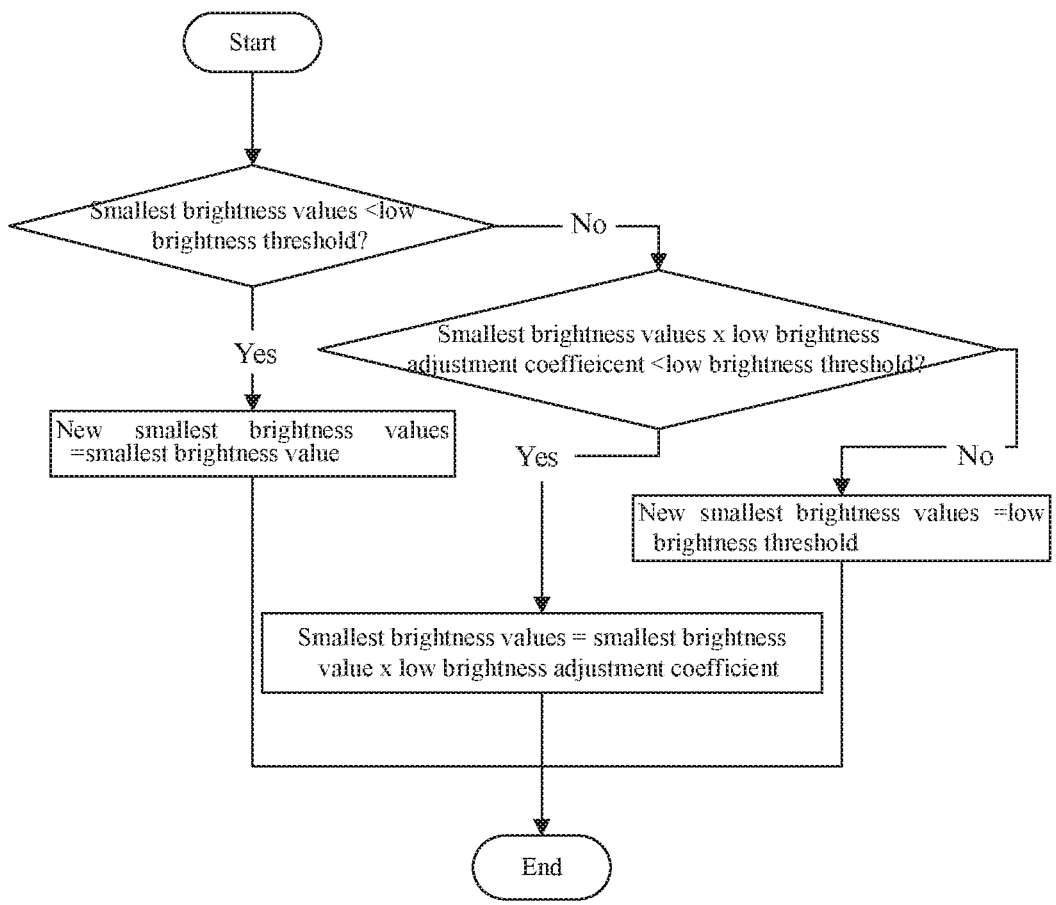
FIG. 5 is a schematic flow chat of adjusting a low brightness value according to another embodiment of the image processing method provided by the present invention.

Referring to FIG. 5, FIG. 5 is a schematic flow chart of adjusting a low brightness value according to another embodiment of the image processing method provided by the present invention.

When the low brightness value is less than the preset low brightness threshold, the low brightness value is unchanged. That is, the new low brightness value is equal to the original low brightness value.

When the low brightness value is greater than the preset low brightness threshold, the low brightness value is decreased. Its detail includes the follows.

When the low brightness value is greater than the preset low brightness threshold, the low brightness value is weighted to multiply the low brightness value $L_1$ by the low brightness adjustment coefficient $R_1$.

The weighted low brightness value is taken as the new low brightness value when the weighted low brightness value $L_2$ is less than the preset low brightness threshold $T_1$. When the weighted low brightness value is greater than the preset low brightness threshold, the low brightness threshold is taken as the new low brightness value, that is, $L_2 = \min\{T_1 * R_1, T_1\}$.

Figure 6:
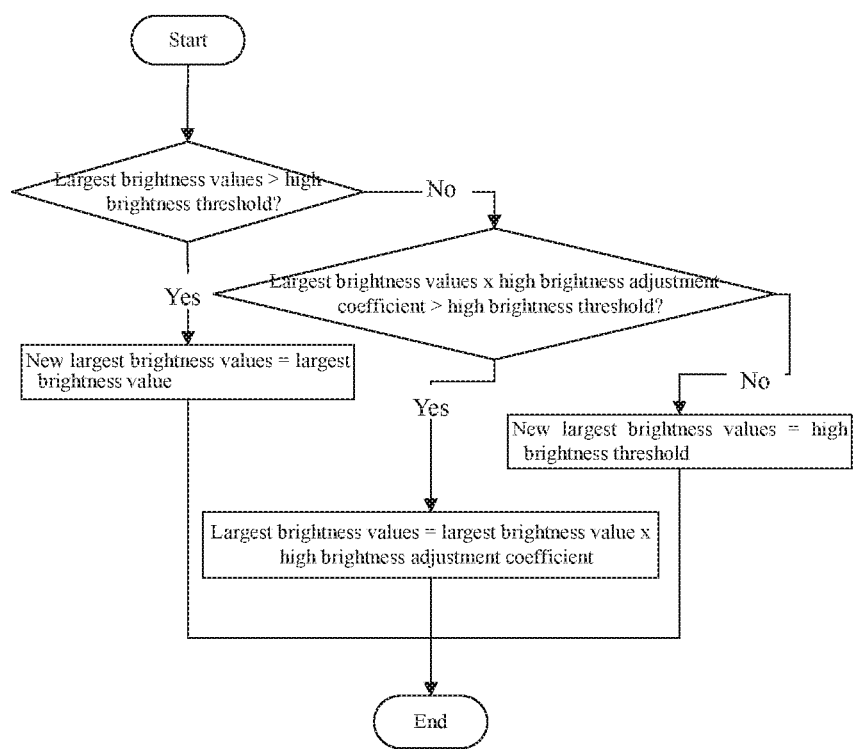
FIG. 6 is a schematic flow chart of adjusting a high brightness value according to another embodiment of the image processing method provided by the present invention.

Referring to FIG. 6, FIG. 6 is a schematic flow chart of adjusting a high brightness value according to another embodiment of an image processing method provided by the present invention.

When the high brightness value is greater than the preset high brightness threshold, the high brightness value is unchanged, that is, the new high brightness value is equal to the original high brightness value.

When the high brightness value is less than the preset high brightness threshold, the high brightness value is increased. Its detail includes the follows.

When the high brightness value is smaller than the preset high brightness threshold, the high brightness value is weighted to multiply the high brightness value $H_2$ by a high brightness adjustment factor $R_2$.

Figure 7A:
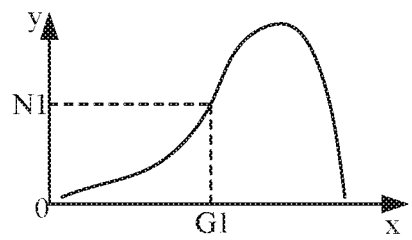
FIG. 7a is a brightness value-pixel quantity schematic diagram of a low brightness value according to another embodiment of the image processing method provided by the present invention.
Figure 7B:
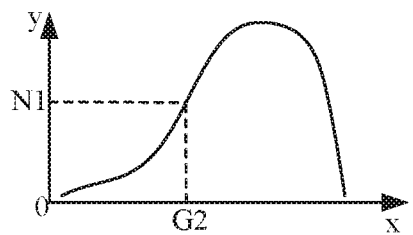
FIG. 7b is a brightness value-pixel quantity schematic diagram of a low brightness value after an adjustment according to another embodiment of the image processing method provided by the present invention.

The weighted high brightness value is taken as the new high brightness value when the weighted high brightness value $H_2$ is greater than the preset high brightness threshold $T_2$. When the weighted high brightness value is less than the preset high brightness threshold, the high brightness threshold is taken as the new high brightness value, that is, $H_2$=min $\{T_2*R_2, T_2\}$. As shown in FIGS. 7a and 7b, FIG. 7a is a brightness value-pixel quantity schematic diagram of a low brightness value according to another embodiment of the image processing method provided by the present invention; FIG. 7b is a brightness value-pixel quantity schematic diagram of a low brightness value after an adjustment according to another embodiment of the image processing method provided by the present invention, wherein N1 is the number of pixels, G1 is a low brightness value corresponding to the number of pixels, and G2 is a new low brightness value corresponding to the number of pixels. It can be seen from the graph that the range for the low brightness value is widened. For example, N1=70, G1=100, G2=80, the low brightness value moves leftward and the range for the low brightness value is expanded.

Figure 8:
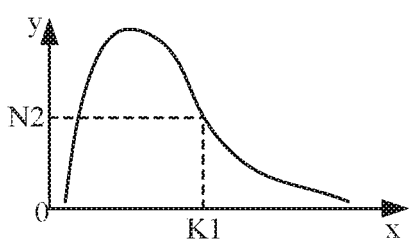
FIG. 8a is a brightness value-pixel quantity schematic diagram of a high brightness value according to another embodiment of the image processing method provided by the present invention.
FIG. 8b is a brightness value-pixel quantity schematic diagram of a high brightness value after an adjustment according to another embodiment of the image processing method provided by the present invention.
Figure 8:
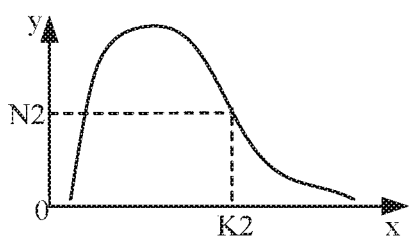

As shown in FIGS. 8a and 8b, FIG. 8a is a brightness value-pixel quantity schematic diagram of a high brightness value according to another embodiment of the image processing method provided by the present invention; FIG. 8b is a brightness value-pixel quantity schematic diagram of a high brightness value after an adjustment according to another embodiment of the image processing method provided by the present invention, wherein N2 is the number of pixels, K1 is a high brightness value corresponding to the number of pixels, and K2 is a new high brightness value corresponding to the number of pixels. It can be seen from the graph that the range for the high brightness value is widened. For example, N2=70, K1=180, K2=200, the high brightness value moves to the right and the range for the high brightness value is expanded.

In Step 45, a step of obtaining the brightness value of each pixel after the brightness adjustment is performed.

Furthermore, the details of adjusting the quantity distribution of the pixels of the target image at different brightness values include the follows.

First, it is assumed that the image size is M×N (M, N is a positive integer), the brightness value of each pixel after brightness adjustment is obtained for each pixel by the following formula:

$$\begin{cases} L' = L_2 + (L - L_1) * \dfrac{M_2 - L_2}{M_1 - L_1}, L \le M_1 \\ L' = H_2 + (L - H_1) * \dfrac{M_2 - H_2}{M_1 - H_1}, L > M_2 \end{cases}$$

In the formula, L is the brightness value of each pixel, L' is the brightness value of the corresponding pixel after the brightness adjustment, $L_1$ is the low brightness value, $L_2$ is the new low brightness value, $H_1$ is the high brightness value, $H_2$ is the new high brightness value, $M_1$ is the initial central brightness value and $M_2$ is the new central brightness value.

After the above steps, the image with the adjusted brightness values is also displayed. If the target image is a grayscale image, the image can be directly output according to the brightness value. If the target image is a color image, it is need to transform the brightness values to get the output image.

For example, if the color image uses L in the (L, a, b) color space as the brightness value, the R, G, B components of the adjusted color image are obtained according to the following formula.

First, (L, a, b) color space is transformed into (X, Y, Z) color space.

$$L = 116 f(Y/Y_0) - 16$$
$$a = 500[f(X/X_0) - f(Y/Y_0)]$$
$$b = 200[f(Y/Y_0) - f(Z/Z_0)]$$
$$\text{wherein, } f(x) = \begin{cases} x^{1/3}, & x > 0.008856 \\ 7.787 + 16/116, & x \le 0.008856 \end{cases}$$

Secondly, (X,Y,Z) color space is transformed into (R,G,B) color space.

$$\begin{bmatrix} R \\ G \\ B \end{bmatrix} = \begin{bmatrix} 0.14847 & -0.15866 & -0.082835 \\ -0.091169 & 0.25243 & 0.015708 \\ 0.00092090 & -0.0025498 & 0.17860 \end{bmatrix} \begin{bmatrix} X \\ Y \\ Z \end{bmatrix}$$

According to the above steps, the brightness information of each pixel can be converted into the color component information of the image, so as to implement the adjustment to the brightness of the target image, to enhance the details of the image in the area where the main brightness is allocated. By means of adjusting the low brightness value of the image to be smaller and the image's higher brightness value higher, the scope of the image that has high displaying brightness is thereby increased.

Figure 9:
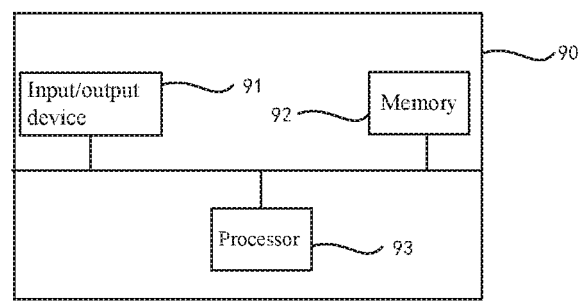
FIG. 9 is a schematic structural diagram of the image processing apparatus according to an embodiment of the present invention.

Referring to FIG. 9, FIG. 9 is a schematic structural diagram of an embodiment of an image processing apparatus according to the present invention. The brightness defect detection apparatus 90 includes an input/output device 91, a memory 92, and a processor 93. The memory is configured to store a computer program. The computer program, when executed by the processor, is configured to implement the steps of:

counting the number of pixels distributing in different brightness values in the target image; determining an initial central brightness value that maximum numbers of pixels have and determining an average brightness value of the target image; and adjusting a quantity distribution of the pixels in the target image at different brightness values, so as to make a new central brightness values that maximum number of pixels have closer to the average brightness value than the initial central brightness value, and to expand a range of pixel brightness values having preset brightness thresholds in which the new central brightness value is included; and transferring the brightness values into image pixel values to get an adjusted image.

Optionally, the processor 93 is further configured to establish a brightness value-pixel quantity histogram with the brightness value as an abscissa and the number of pixels as an ordinate.

Optionally, the processor 93 is further configured to execute the step of determining, by using the brightness value-pixel quantity histogram, a brightness value corresponding to a maximum value of the number of pixels as the initial central brightness value; using the brightness value-pixel quantity histogram to determine a high brightness value and a low brightness value, and averaging the brightness values of the target image to obtain the average brightness value.

Optionally, the processor 93 is further configured to execute a step of accumulating a preset number of pixels from the number of pixels with the lowest brightness value and using the brightness value of the last accumulated pixel number as the low brightness value; and accumulating the number of pixels from the number of pixels with the highest brightness value by adding the preset number of pixels, and setting the brightness value of the last accumulated pixel as the high brightness value.

Optionally, the processor 93 is further configured to decrease the low brightness value when the low brightness value is greater than a preset low brightness threshold; and to increase the high brightness value when the high brightness value is less than a preset high brightness threshold.

Optionally, the processor 93 is further configured to execute the following steps. When the low brightness value is greater than the preset low brightness threshold, a weighting process on the low brightness value is performed. When the low brightness value after weighting process is less than the preset low brightness threshold, the weighted low brightness value is taken as a new low brightness value. When the weighted low brightness value is greater than the preset low brightness threshold, the low brightness threshold is taken as the new low brightness value. When the high brightness value is less than a preset high brightness threshold, a weighting process on the high brightness value to increase the high brightness value is performed. When the weighted high brightness value is greater than the preset high brightness threshold, the weighted high brightness value is used as a new high brightness value. When the weighted brightness value is smaller than the preset high brightness threshold, the preset high brightness threshold is used as the new high brightness value.

Optionally, the processor 93 is further configured to obtain, by using the following formula, a brightness value of each pixel after being done for brightness adjustment.

$$\begin{cases} L' = L_2 + (L - L_1) * \dfrac{M_2 - L_2}{M_1 - L_1}, & L \le M_1 \\ L' = H_2(L - H_1) * \dfrac{M_2 - H_2}{M_1 - H_1}, & L > M_2 \end{cases},$$

wherein L is a brightness value of each pixel, L' is a brightness value of a corresponding pixel after brightness adjustment, $L_1$ is a low brightness value, $L_2$ is a new low brightness value, $H_1$ is a high brightness value, $H_2$ is a new high brightness value, $M_1$ is an initial central brightness value, and $M_2$ is a new central brightness value.

Optionally, the processor 93 is further configured to perform a weighting process on the average brightness value to use the weighted average brightness value as a new central brightness value. When the initial central brightness value is greater than the average brightness value, the weighting coefficient of the weighting process is greater than 1, and when the initial central brightness value is less than the average brightness value, the weighting coefficient of the weighting process is less than 1.

Optionally, the processor 93 is further configured to acquire a target image. When the target image is a grayscale image, a grayscale value of each pixel in the target image is acquired as a brightness value. When the target image is a color image, a brightness value of a color component of each pixel in the target image is obtained.

Optionally, the image processing apparatus can be a display or an independent device that can be connected to a display.

It can be understood that the steps and working principles performed by the image processing apparatus provided in this embodiment are similar to those in the foregoing embodiments, and details are not described herein again.

In the several embodiments provided in the present invention, it should be understood that the disclosed method and apparatus may be implemented in other manners. For example, the device implementation described above is merely exemplary. For example, the module or unit division is merely logical function division and may be other division in actual implementation. For example, a plurality of units or components may be combined or may be integrated into another system, or some of the features may be ignored or not performed.

The units described as separate components may or may not be physically separated. The components shown as units may or may not be physical units, that is, may be located in one place or may also be distributed to multiple network units. Some or all of the units may be selected according to actual needs to achieve the objectives of the solution of the embodiments.

In addition, each functional unit in the embodiments of the present invention may be integrated in one processing unit, or each unit may exist physically alone, or two or more units may be integrated in one unit. The above-mentioned integrated unit can be implemented in the form of hardware or in the form of software functional unit.

The above is only the embodiments of the present invention, and does not intend to limit the scope of the present invention. All equivalent structures or equivalent process changes made by using the present specification and the accompanying drawings as well as direct or indirect use in other related technologies are all included in the scope of the patent protection of the present invention.

What is claimed is:

1. An image processing method, comprising the steps of acquiring a target image;
    obtaining a gray value of each pixel in the target image as a brightness value when the target image is a grayscale image;
    obtaining a brightness value of one color component of each pixel in the target image when the target image is a color image;
    establishing a brightness value-pixel quantity histogram with the brightness value as an abscissa and the number of pixels as a vertical coordinate;
    determining an initial central brightness value that maximum numbers of pixels have and determining an average brightness value of the target image; and
    adjusting a quantity distribution of the pixels in the target image at different brightness values, so as to make a new central brightness values that maximum number of pixels have closer to the average brightness value than the initial central brightness value, and to expand a range of pixel brightness values having preset brightness thresholds in which the new central brightness value is included.

2. The method as claimed in claim 1, wherein the step of determining an initial central brightness value that maximum numbers of pixels have and determining an average brightness value of the target image comprises:
    determining a brightness value corresponding to a maximum value of the number of pixels in the brightness value-pixel number histogram as the initial central brightness value;

determining a high brightness value and a low brightness value by using the brightness value-pixel number histogram; and averaging brightness values of the image to obtain the average brightness value.

3. The method as claimed in claim 1, wherein the step of determining a high brightness value and a low brightness value by using the brightness value-pixel number histogram comprises:

accumulating the number of pixels having the lowest brightness value by adding a preset number of pixels, setting the brightness value of the last accumulated number of pixels as the low brightness value; and accumulating the number of pixels having the highest brightness value by adding the present number of pixels, and setting the brightness value of the last accumulated number of pixels as the high brightness value.

4. The method as claimed in claim 1, further comprising the steps of:

reducing the low brightness value when the low brightness value is larger than a preset low brightness threshold; and increasing the high brightness value when the high brightness value is less than a preset high brightness threshold.

5. The method as claimed in claim 1, wherein the step of reducing the low brightness value when the low brightness value is larger than a preset low brightness threshold comprises the steps of:

weighting the low brightness value in case the low brightness value is greater than the preset low brightness threshold;

taking the weighted low brightness value as a new low brightness value when the weighted low brightness value is less than the preset low brightness threshold; and taking the low brightness threshold as the new low brightness value when the weighted low brightness value is greater than the preset low brightness threshold;

and wherein the step of increasing the high brightness value when the high brightness value is less than a preset high brightness threshold comprises the steps of:

weighting the high brightness value when the high brightness value is less than the preset high brightness threshold;

taking the weighted high brightness value as a new high brightness value when the weighted high brightness value is greater than the preset high brightness threshold; and taking the high brightness threshold as the new high brightness value when the weighted high brightness value is less than the preset high brightness threshold.

6. The method as claimed in claim 5, wherein the step of adjusting the quantity distribution of the pixels of the target image at different brightness values comprises using the following formula to obtain the brightness value of each pixel after brightness adjustment:

$$\begin{cases} L' = L_2 + (L - L_1) * \frac{M_2 - L_2}{M_1 - L_1}, & L \le M_1 \\ L' = H_2 + (L - H_1) * \frac{M_2 - H_2}{M_1 - H_1}, & L > M_2 \end{cases}$$

wherein L is the brightness value of each pixel, L' is the brightness value of the corresponding pixel after the brightness adjustment, $L_1$ is the low brightness value, $L_2$ is the new low brightness value, $H_1$ is the high brightness value, $H_2$ is the new high brightness value, $M_1$ is the initial central brightness value and $M_2$ is the new central brightness value.

7. The method as claimed in claim 1, wherein the step of adjusting a quantity distribution of the pixels in the target image at different brightness values so as to make a new central brightness values that maximum number of pixels have closer to the average brightness value than the initial central brightness value and to expand a range of pixel brightness values having preset brightness thresholds in which the new central brightness value is included comprises the steps of:

weighting the average brightness value and taking the weighted average brightness value as the new central brightness value, wherein when the initial central brightness value is larger than the average brightness value, the weighting coefficient of the weighting process is larger than 1, and when the initial central brightness value is less than the average brightness value, the weighting coefficient of the weighting process is less than 1.

8. An image processing method, comprising the steps of counting the number of pixels distributing in different brightness values in the target image;

determining an initial central brightness value that maximum numbers of pixels have and determining an average brightness value of the target image; and adjusting a quantity distribution of the pixels in the target image at different brightness values, so as to make a new central brightness values that maximum number of pixels have closer to the average brightness value than the initial central brightness value, and to expand a range of pixel brightness values having preset brightness thresholds in which the new central brightness value is included.

9. The method as claimed in claim 8, wherein the step of counting the number of pixels distributing in different brightness values in the target image comprises a step of establishing a brightness value-pixel quantity histogram with the brightness value as an abscissa and the number of pixels as a vertical coordinate.

10. The method as claimed in claim 9, wherein the step of determining an initial central brightness value that maximum numbers of pixels have and determining an average brightness value of the target image comprises:

determining a brightness value corresponding to a maximum value of the number of pixels in the brightness value-pixel number histogram as the initial central brightness value;

determining a high brightness value and a low brightness value by using the brightness value-pixel number histogram; and averaging brightness values of the image to obtain the average brightness value.

11. The method as claimed in claim 10, wherein the step of determining a high brightness value and a low brightness value by using the brightness value-pixel number histogram comprises:

accumulating the number of pixels having the lowest brightness value by adding a preset number of pixels, setting the brightness value of the last accumulated number of pixels as the low brightness value; and accumulating the number of pixels having the highest brightness value by adding the present number of pixels, and setting the brightness value of the last accumulated number of pixels as the high brightness value.

12. The method as claimed in claim 11, further comprising the steps of:
reducing the low brightness value when the low brightness value is larger than a preset low brightness threshold; and
increasing the high brightness value when the high brightness value is less than a preset high brightness threshold.

13. The method as claimed in claim 12, wherein the step of reducing the low brightness value when the low brightness value is larger than a preset low brightness threshold comprises the steps of:
weighting the low brightness value in case the low brightness value is greater than the preset low brightness threshold;
taking the weighted low brightness value as a new low brightness value when the weighted low brightness value is less than the preset low brightness threshold; and
taking the low brightness threshold as the new low brightness value when the weighted low brightness value is greater than the preset low brightness threshold;
and wherein the step of increasing the high brightness value when the high brightness value is less than a preset high brightness threshold comprises the steps of:
weighting the high brightness value when the high brightness value is less than the preset high brightness threshold;
taking the weighted high brightness value as a new high brightness value when the weighted high brightness value is greater than the preset high brightness threshold; and
taking the high brightness threshold as the new high brightness value when the weighted high brightness value is less than the preset high brightness threshold.

14. The method as claimed in claim 13, wherein the step of adjusting the quantity distribution of the pixels of the target image at different brightness values comprises using the following formula to obtain the brightness value of each pixel after brightness adjustment:

$$\begin{cases} L' = L_2 + (L - L_1) * \frac{M_2 - L_2}{M_1 - L_1}, & L \leq M_1 \\ L' = H_2 + (L - H_1) * \frac{M_2 - H_2}{M_1 - H_1}, & L > M_2 \end{cases}$$

wherein L is the brightness value of each pixel, L' is the brightness value of the corresponding pixel after the brightness adjustment, $L_1$ is the low brightness value, $L_2$ is the new low brightness value, $H_1$ is the high brightness value, $H_2$ is the new high brightness value, $M_1$ is the initial central brightness value and $M_2$ is the new central brightness value.

15. The method as claimed in claim 8, wherein the step of adjusting a quantity distribution of the pixels in the target image at different brightness values so as to make a new central brightness values that maximum number of pixels have closer to the average brightness value than the initial central brightness value and to expand a range of pixel brightness values having preset brightness thresholds in which the new central brightness value is included comprises the steps of:
weighting the average brightness value and taking the weighted average brightness value as the new central brightness value,
wherein when the initial central brightness value is larger than the average brightness value, the weighting coefficient of the weighting process is larger than 1, and when the initial central brightness value is less than the average brightness value, the weighting coefficient of the weighting process is less than 1.

16. The method as claimed in claim 8, before the step of counting the number of pixels distributing in different brightness values in the target image, further comprises steps of
acquiring a target image;
acquiring a grayscale of each pixel in the target image as a brightness value when the target image is a grayscale image; and
acquiring a brightness value of one color component of each pixel in the target image when the target image is a color image.

17. An image processing apparatus, comprising:
a memory, a processor, and an input/output device, connected to each other, the memory being configured to store a computer program and the computer program being executed by the processor to implement the following steps:
counting the number of pixels distributing in different brightness values in the target image;
determining an initial central brightness value that maximum numbers of pixels have and determining an average brightness value of the target image; and
adjusting a quantity distribution of the pixels in the target image at different brightness values, so as to make a new central brightness values that maximum number of pixels have closer to the average brightness value than the initial central brightness value, and to expand a range of pixel brightness values having preset brightness thresholds in which the new central brightness value is included.

18. The image processing apparatus as claimed in claim 17, wherein the processing further executes the steps of
establishing a brightness value-pixel quantity histogram with the brightness value as an abscissa and the number of pixels as a vertical coordinate.

19. The image processing apparatus as claimed in claim 18, wherein the processing further executes the steps of
determining a brightness value corresponding to a maximum value of the number of pixels in the brightness value-pixel number histogram as the initial central brightness value;
determining a high brightness value and a low brightness value by using the brightness value-pixel number histogram; and
averaging brightness values of the image to obtain the average brightness value.

20. The image processing apparatus as claimed in claim 19, wherein the processing further executes the steps of:
accumulating the number of pixels having the lowest brightness value by adding a preset number of pixels, setting the brightness value of the last accumulated number of pixels as the low brightness value; and
accumulating the number of pixels having the highest brightness value by adding the present number of pixels, and setting the brightness value of the last accumulated number of pixels as the high brightness value.

* * * * *